(12) United States Patent
Fujiwara

(10) Patent No.: US 8,523,154 B2
(45) Date of Patent: Sep. 3, 2013

(54) VIBRATION CONTROL EQUIPMENT

(75) Inventor: Nobuhiro Fujiwara, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 766 days.

(21) Appl. No.: 12/593,778

(22) PCT Filed: Mar. 28, 2008

(86) PCT No.: PCT/JP2008/056116
§ 371 (c)(1),
(2), (4) Date: Sep. 29, 2009

(87) PCT Pub. No.: WO2008/120728
PCT Pub. Date: Oct. 9, 2008

(65) Prior Publication Data
US 2010/0133734 A1    Jun. 3, 2010

(30) Foreign Application Priority Data
Mar. 30, 2007 (JP) .................................. 2007-095292

(51) Int. Cl.
*B60G 11/22* (2006.01)
*F16F 1/36* (2006.01)
(52) U.S. Cl.
USPC ...................... 267/293; 257/141.1; 257/141.3
(58) Field of Classification Search
USPC ........... 267/292, 293, 294, 141, 140.4, 141.1, 267/141.2, 141.3, 141.4, 141.5; 248/634, 248/635
See application file for complete search history.

(56) References Cited

U.S. PATENT DOCUMENTS 4,213,718 A * 7/1980 Lumby ........................ 403/197
4,252,339 A * 2/1981 Shimizu et al. ........ 280/124.108

(Continued)

FOREIGN PATENT DOCUMENTS

| JP | 59-191452 U | 12/1984 |
| JP | 60-205043 A | 10/1985 |

(Continued)

OTHER PUBLICATIONS

Extended European Search Report issued May 16, 2012 in corresponding EP Patent Application No. 08739234.6.
International Search Report dated Apr. 15, 2008 (3 pages).

(Continued)

*Primary Examiner* — Melody Burch
(74) *Attorney, Agent, or Firm* — Sughrue Mion, PLLC

(57) ABSTRACT

In a vibration control equipment 1 constituted by inserting an outer tube 20 of pair of damping rubbers 2A, 2B into an opening 30 of a bracket member 3, clamping the pair of damping rubbers 2A, 2B by means of plate members 4A, 4B, tightening a fastening member 5 for coupling the plate members 4A, 4B, and then compressing the rubber elastic bodies 22 of the damping rubbers 2A, 2B in the axial direction, the outside diameter of the outer tube 20 before tightening the fastening member 5 is smaller than the inside diameter of the fixing hole 30, the rubber elastic bodies 22 are compression deformed by tightening the fastening member 5 and thus a bracket member 3 is clamped by means of upper and lower flange portions 23, at least one of the rubber elastic bodies 22 is provided with mold cavity portions 26A, 26B and at least one of the pair of outer tubes 20 is provided with a positioning portion 24 for determining the circumferential position of the pair of damping rubbers 2A, 2B relative to the bracket member 3. According to the present invention, assembling work is facilitated by arranging the mold cavity portions in accordance with the direction of vibration and the production cost can be reduced.

6 Claims, 10 Drawing Sheets

(56) References Cited

U.S. PATENT DOCUMENTS

| | | | | |
|---|---|---|---|---|
| 5,080,335 A | * | 1/1992 | Solleder et al. | 267/141.4 |
| 5,397,112 A | * | 3/1995 | Roth et al. | 267/140.12 |
| 5,743,509 A | * | 4/1998 | Kanda et al. | 248/635 |
| 5,842,677 A | * | 12/1998 | Sweeney et al. | 248/635 |
| 7,735,812 B2 | * | 6/2010 | Fitzgerald | 267/293 |

FOREIGN PATENT DOCUMENTS

| | | |
|---|---|---|
| JP | 7-117712 A | 5/1995 |
| JP | 11-311280 A | 11/1999 |
| JP | 2000-193003 A | 7/2000 |
| JP | 2003-97629 A | 4/2003 |
| JP | 2006-300106 A | 11/2006 |

* cited by examiner (a)

(b)

(a)

(b)

(a)

(b)

VIBRATION CONTROL EQUIPMENT

TECHNICAL FIELD

The present invention relates to a vibration control equipment for use in a cabin mount or engine mount of machines for agriculture or construction.

The present application claims priority from Japanese Patent Application No. 2007-095292, filed on Mar. 30, 2007, the content of which is hereby incorporated by reference into this application.

BACKGROUND ART

In general, when a vibration generating body, such as an engine, is mounted on a vibration receiving body, such as a vehicle body, a vibration control equipment is interposed between the vibration generating body and the vibration receiving body so as to prevent or suppress vibration from being transmitted from the vibration generating body to the vibration receiving body. As such a vibration control equipment, there is a sandwich-type vibration control equipment including a pair of damping rubbers and plate members placed on both sides of the damping rubbers. Each of the damping rubbers is composed of an outer tube formed substantially in the shape of a cylinder and has a flange portion formed at an axial outer end portion, an inner tube substantially in the shape of a cylinder disposed in the inside of the outer tube, and a rubber elastic body interposed between the outer tube and the inner tube. The pair of damping rubbers is connected to each other by abutting the axial inner ends thereof, so that the damping rubbers are axially clamped at the outside thereof by means of the pair of plate members. Also, the pair of plate members is connected to each other by means of fastening members, such as bolts, penetrating through the inside of the pair of inner tubes (e.g., see Patent Document 1).

With the sandwich-type vibration control equipment constructed as described above, as the stiffness of the damping rubber is lowered, the vibration-resistance properties are enhanced. However, there is a problem that if the support rigidity of the damping rubbers is lowered too much, the vibration generating body interferes with surrounding objects. Consequently, a technique of forming mold cavity portions in a rubber elastic body has been proposed in order to improve the vibration-resistance properties of the damping rubbers, as well as ensuring the support rigidity of the damping rubbers. In the damping rubber having the mold cavity portions, since the rigidity is lowered only in the arranging direction of the mold cavity portions, the vibration-resistance performance thereof is different in the vibration input direction. According to this technique, since the rigidity in the direction of the vibration transmitted from the vibration generating body can be set lower, it can ensure the support rigidity and thus improve the vibration-resistance properties (e.g., see Patent Document 2).

For example, in the case where the vibration control equipment is installed on the vehicle body through a bracket member and the plate member of the vibration control equipment is fixed to a lower portion of the engine, the vibration transmitted from the engine to the vibration control equipment causes rolling vibration to be generated around a driving shaft of the engine. In this instance, the mold cavity portions are disposed in a planar rolling direction, that is, a right and left direction (a horizontal direction perpendicular to an engine shaft), so that the damping rubbers are positioned in a circumferential direction. This will help to ensure the support rigidity and improve the vibration-resistance properties, while the rigidity is maintained intact in an upward and downward direction (an axial direction of the damping rubbers) and a front and rear direction (a direction in parallel with the engine shaft) but the rigidity is lowered in the left and right direction.

[Patent Document 1] Japanese Unexamined Utility Model Application, First Publication No. S59-191452

[Patent Document 2] Japanese Unexamined Patent Application, First Publication No. 2000-193003

DISCLOSURE OF THE INVENTION

Problem to be Solved by the Invention

According to conventional vibration control equipment, however, the circumferential direction of the damping rubbers is fixed by pressing the damping rubbers into holes of substantially cylindrical shape formed in the bracket member when assembling, with the circumferential direction of the damping rubbers being fixed. For this reason, there is a problem that the assembling work is complicated. Also, there is another problem that the production cost is increased since the press fitting process requires jigs for the press fitting.

Therefore, the present invention has been made to solve the above-mentioned problems occurring in the prior art, and an object of the present invention is to provide a vibration control equipment which can dispose a mold cavity portion in line with a vibrating direction and can be easily assembled to reduce the production cost.

Means for Solving the Problem

The vibration control equipment according to the present invention including a pair of damping rubbers each having an outer tube, an axial outer end of the outer tube being provided with a flange portion extending outwardly in a radial direction, an inner tube disposed in the outer tube, and a rubber elastic body for connecting the outer tube and the inner tub; the damping rubbers being symmetrically disposed in a vertical direction; a pair of plate members, with the pair of damping rubbers being interposed between the pair of plate members; a bracket member interposed between the upper and lower flange portions of the pair of damping rubbers, and provided with a fixing hole, through which each outer tube of the pair of damping rubbers is inserted from an upper portion and a lower portion; and a fastening member that connects the pair of plate members. In the vibration control equipment, the bracket member is fixed to any one of a vibration generating body and a vibration receiving body, at least one of the pair of plate members is fixed to the other of the vibration generating body and the vibration receiving body, and the rubber elastic bodies are axially compressed through the pair of plate members by firmly fastening the fastening member. In the vibration control equipment, before the fastening member is firmly fastened, the outer tube has an outer diameter smaller than an inner diameter of the fixing hole; the rubber elastic bodies are compressively deformed by firmly fastening the fastening member, so that the flange portion comes into close contact with the bracket member to clamp the bracket member by the upper and lower flange portions; at least any one of the pair of rubber elastic bodies is provided with a mold cavity portion; and at least one of the pair of outer tubes is provided with a positioning portion for determining circumferential positions of the pair of damping rubbers with respect to the bracket member.

With the above characteristics, the pair of damping rubbers are disposed on and under the bracket member, and the outer tube of one damping rubber is inserted into the fixing hole of the bracket member from the upper side of the bracket member. The outer tube of the other damping rubbers is inserted into the fixing hole of the bracket member from the lower side of the bracket member. In this instance, the outer tubes have an outer diameter smaller than the inner diameter of the fixing hole, and a clearance is formed between the outer circumferential surface of the outer tube and the inner circumferential surface of the fixing hole. That is, the outer tubes are inserted into the fixing holes in a non-pressing state. Also, when the outer tubes are inserted into the fixing hole, in order to dispose the mold cavity portions in line with the vibrating direction of the vibration generating body, each circumferential position of the damping rubbers is determined with respect to the bracket member by the positioning portion. The plate members are disposed on and under the pair of damping rubbers, and the upper and lower plate members are connected to each other by means of the fastening member penetrating the inside of the inner tube. As the fastening member is fastened, the pair of damping rubbers is vertically pressed by the pair of plate members. Therefore, the axial inner ends of the pair of opposite inner tubes come into contact with each other. Also, as the fastening member is fastened, the rubber elastic body is axially compressed, and then is elastically deformed in such a way that it is radially expanded to the outside. Therefore, the flange portions of the outer tubes connected to the rubber elastic body come into close contact with the bracket member, and the bracket member is clamped between the upper and lower flange portions, so that the pair of the damping rubbers is fixed to the bracket member.

Also, in the vibration control equipment according to the present invention, the bracket member may be provided with an engaging portion which is engaged with the positioning portion.

With the above configuration, when the outer tube of the damping rubber is inserted into the fixing hole of the bracket member, the positioning portion provided on the outer tube is engaged with the engaging portion provided on the bracket portion, so that the circumferential position of the damping rubbers is determined with, respect to the bracket member.

Also, in the vibration control equipment according to the present invention, the positioning portion may be provided on the flange portion.

With the above configuration, it is possible to easily manufacture the outer tube as compared with the case where the outer circumferential surface of the outer tube is provided with the positioning portion. Also, in the case that the bracket member is provided with the engaging portion, the engaging portion is provided on the upper surface or lower surface of the bracket member opposite to the flange portion of the outer tube, so that it is possible to easily manufacture the bracket member as compared with the case where the engaging portion is formed on the inner circumferential surface of the fixing hole.

Also, in the vibration control equipment according to the present invention, the pair of the outer tubes may be provided with the positioning portion.

With the above configuration, the circumferential position of one damping rubber and the circumferential position of the other damping rubber are respectively determined by the positioning portion, so that the mold cavity portion provided on one damping rubber and the mold cavity portion provided on the other damping rubber are respectively disposed in line with the vibrating direction of the vibration generating body.

Also, in the vibration control equipment according to the present invention, a damping rubber positioning portion may be provided between the pair of damping rubbers to determine the relative circumferential position between the pair of damping rubbers.

With the above configuration, when the outer tubes of the pair of damping rubbers are each inserted into the fixing holes, the relative circumferential position between one damping rubber and the other damping rubber is determined by the damping rubber positioning portion, and there is no position difference between the pair of damping rubbers. Therefore, if the circumferential position of one damping rubber is determined with respect to the bracket member, the circumferential position of the other damping rubber is determined with respect to the bracket. For example, in the case where the positioning portion is provided on the outer tube of one damping rubber and the positioning portion is not provided on the outer tube of the other damping rubber, if there is the damping rubber positioning portion, the circumferential position of the other damping rubber is determined with respect to the bracket member, so that it is possible to dispose the mold cavity portion provided on the other damping rubber in line with the vibrating direction.

Also, in the vibration control equipment according to the present invention, one of the pair of damping rubbers having the mold cavity portion may include an outer tube side segment body, in which an outer circumferential portion of the rubber elastic body is attached to the outer tube, and an inner tube side segment body, in which an inner circumferential portion of the rubber elastic body is attached to the inner tube to form the mold cavity portion.

With the above configuration, it is possible to easily form the rubber elastic body, and defects, such as hollows or cracks, are hardly formed in the rubber elastic body as compared with the case of manufacturing the damping rubber by connecting the rubber elastic body between the outer tube and the inner tube. Further, it is possible to easily form the mold cavity portion.

In addition, in the vibration control equipment according to the present invention, a segment body positioning portion may be provided between the segment bodies to determine the relative circumferential position between the segment bodies.

With the above configuration, the relative circumferential position between the pair of segment bodies is determined by the segment body positioning portion, and there is no position difference between the segment bodies. Therefore, if the circumferential position of the outer tube side segment body is determined by the positioning portion provided on the outer tube, the position of the other segment body assembled to the outer tube side segment body is determined, and the mold cavity portion provided on the inner tube side segment body is disposed in line with the vibrating direction.

Also in the vibration control equipment according to the invention, the mold cavity portion may be axially penetrated.

With the above configuration, it is possible to easily form the mold cavity portions as compared with the damping rubber having a non-penetrating mold cavity portion. Also, it is possible to easily set the property of the damping rubbers as compared with the damping rubber with non-penetrating mold cavity portion.

Also, in the vibration control equipment according to the present invention, the mold cavity portion may be a non-penetrating hole extending axially.

With the above configuration, even though the non-penetrating mold cavity portion is provided, the spring stiffness of the mold cavity portion in the displacement direction is lowered as compared with the direction in which the mold cavity portion is not formed, which is effective.

Effect of the Invention

With the vibration control equipment according to the present invention, the outer tubes of the damping rubbers are inserted into the fixing holes of the bracket member in the non-pressing state, and in order to dispose the position of the mold cavity portion in line with the vibrating direction of the vibration generating body, the circumferential position of the damping rubbers is determined with respect to the bracket member by the positioning portion. Therefore, it is possible to improve the vibration-resistance properties of the damping rubbers, while ensuring the support rigidity of the damping rubbers. Also, it is possible to easily assemble the vibration control equipment, and thus lower the production cost.

Figure 1:
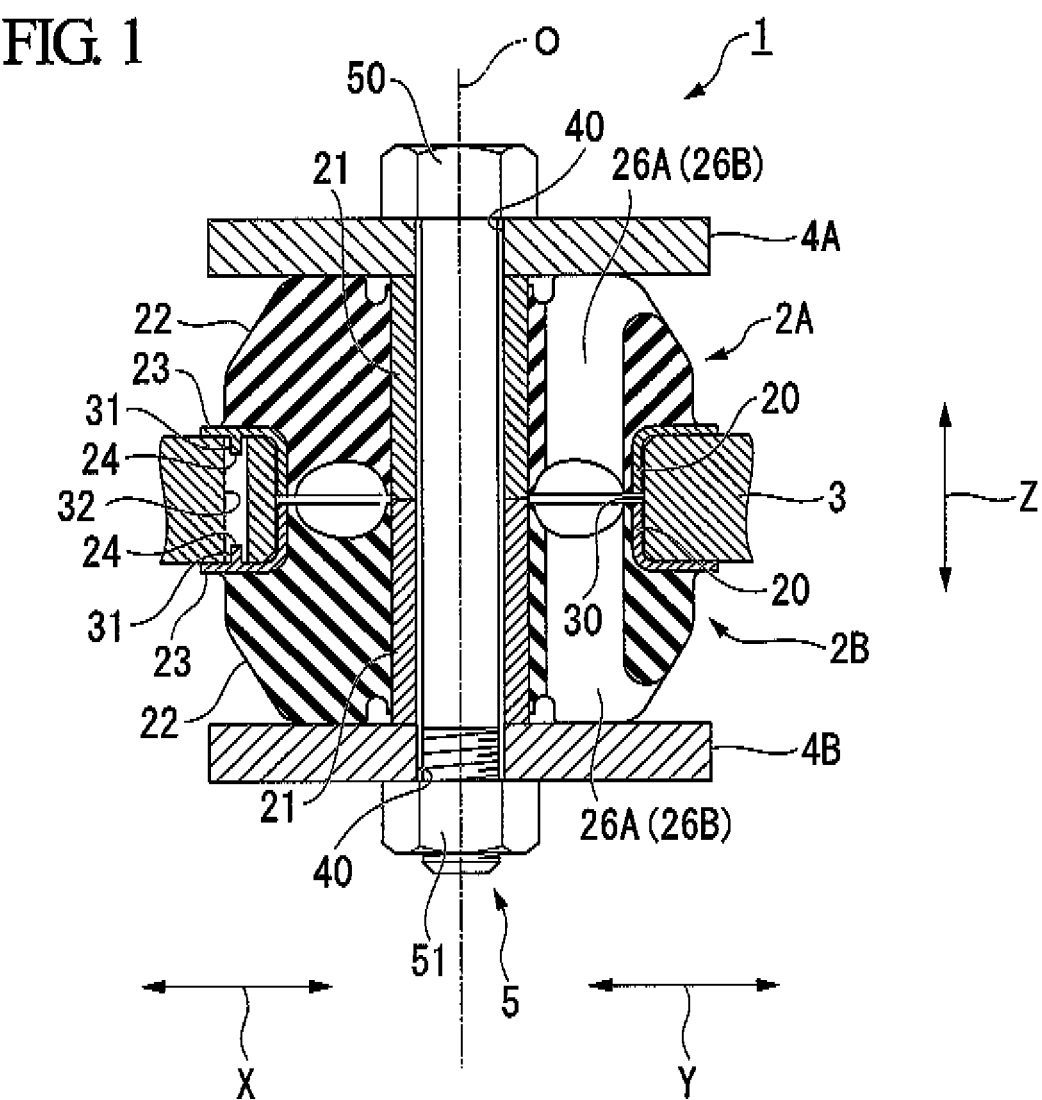
FIG. 1 is a cross-sectional view of the vibration control equipment to explain a first embodiment of the present invention.

DESCRIPTION OF REFERENCE NUMERALS 1, 101: VIBRATION CONTROL EQUIPMENT
2A, 2B: DAMPING RUBBER
3: BRACKET MEMBER
4A, 4B: A PAIR OF PLATE MEMBERS
5: FASTENING MEMBER
20: OUTER TUBE
21: INNER TUBE
22, 122: RUBBER ELASTIC BODY
23, 123: FLANGE PORTION
24, 124, 224: POSITIONING PORTION
26A, 26B, 126A, 126B, 226A, 226B: MOLD CAVITY PORTION
27: DAMPING RUBBER POSITIONING PORTION
30: FIXING HOLE
31, 131: ENGAGING PORTION
114: SEGMENT BODY POSITIONING PORTION

BEST MODE FOR CARRYING OUT THE INVENTION

A vibration control equipment according to first and second embodiments of the present invention will now be described with reference to the accompanying drawings.

First Embodiment

First of all, a vibration control equipment 1 according to the first embodiment will now be described with reference to FIGS. 1 to 3.

In the description below, the direction (horizontal direction) denoted by the symbol X shown in the figure is referred to as the front and rear direction, the direction (the vertical direction) denoted by the symbol Y shown in the figure is referred to as the left and right direction, and the direction (the vertical direction) denoted by the symbol Z shown in the figure is referred to as the upward and downward direction. Also, when viewing from one damping rubber 2A (2B), an opposite surface side (a lower side in (b) of FIG. 2) facing the other damping rubber 2B (2A) is referred to as an axial inner side, and a side (an upper side in (b) of FIG. 2) opposite to the surface is referred to as an axial outer side.

FIG. 1 is a cross-sectional view of a vibration control equipment 1 according to the first embodiment of the present invention.

Figure 2:
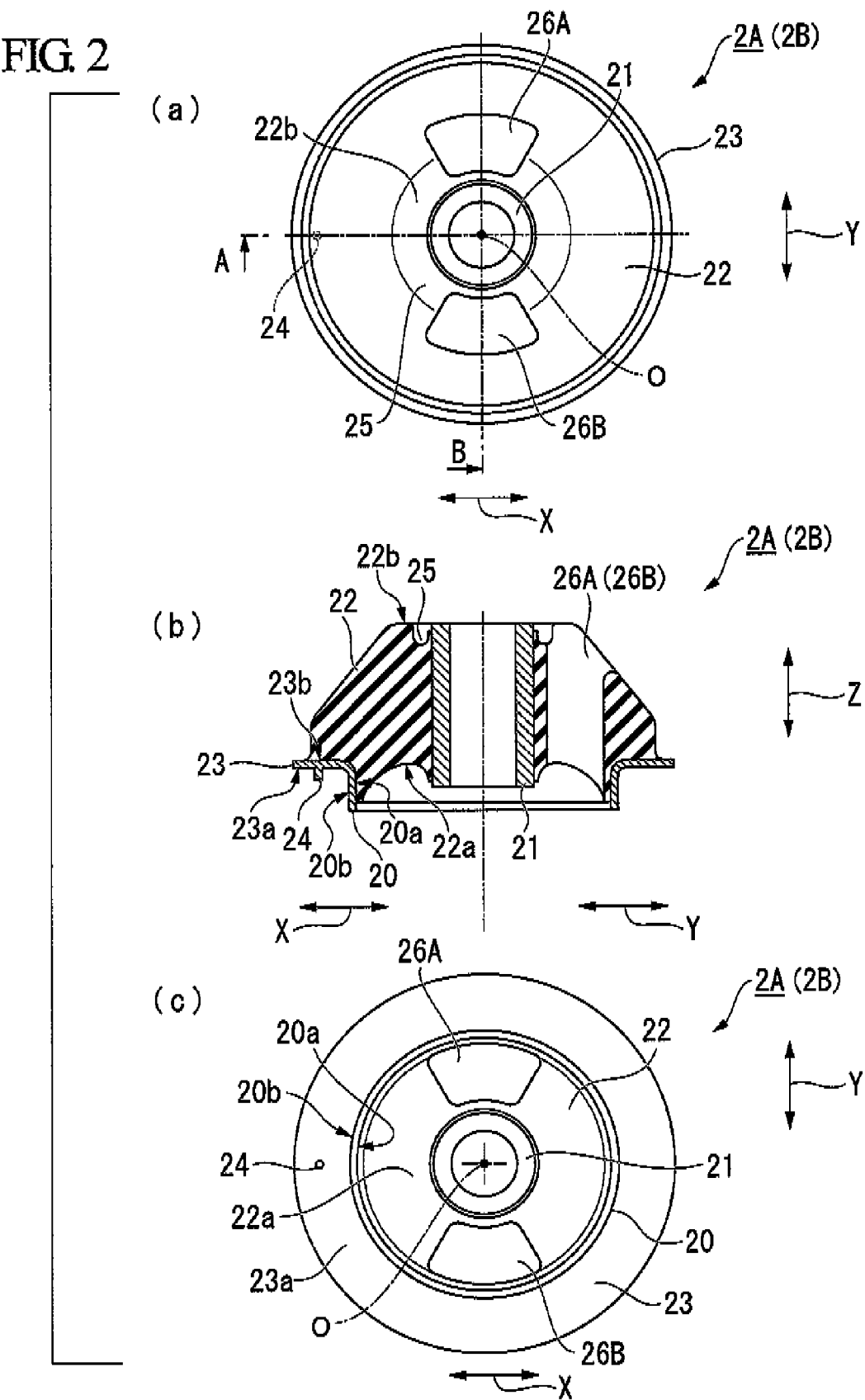
FIG. 2 is a view showing a damping rubber to explain the first embodiment of the present invention, in which (a) is a plan view, (b) is a cross-sectional view, and (c) is a plan view.

FIG. 2 is a view showing the damping rubber 2A (2B) to which an external force is not applied. (a) of FIG. 2 is a plan view when viewing from an axial outer side, (b) pf FIG. 2 is a cross-sectional view taken along the line A-O-B shown in (a) of FIG. 2, and (c) of FIG. 2 is a plan view when viewing from an axial inner side.

Figure 3:
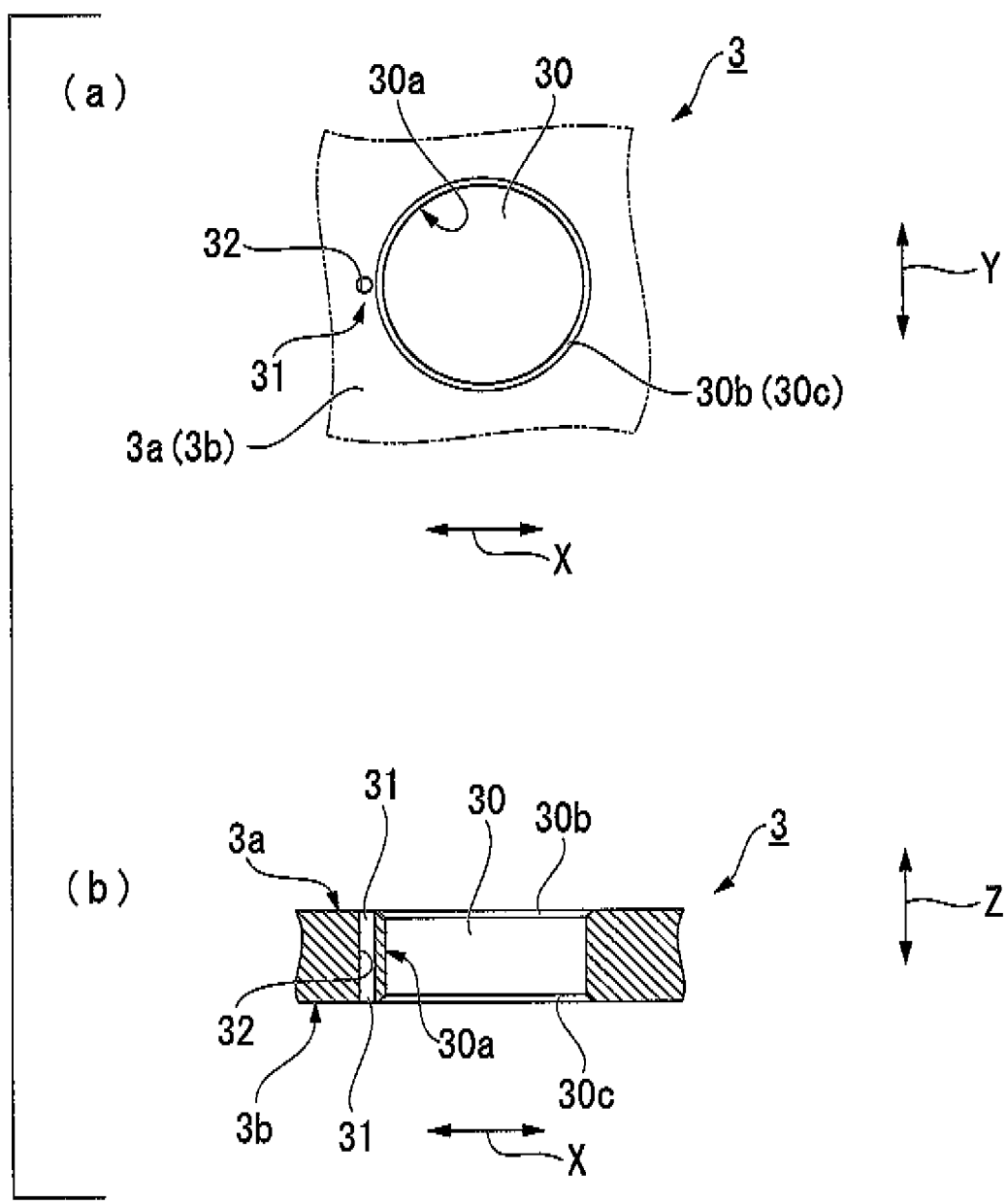
FIG. 3 is a view showing a bracket member to explain the first embodiment of the invention, in which (a) is a plan view, and (b) is a cross-sectional view.

FIG. 3 is a view showing a bracket member 3. (a) of FIG. 3 is a plan view, and (b) of FIG. 3 is a cross-sectional view.

Reference numeral O in the drawings denotes a central axis of the vibration control equipment 1.

Also in FIG. 1 and (b) of FIG. 2, a left half part (a left side from the central axis O) is a cross section taken along a front and rear direction, while a right half part (a right side from the central axis O) is a cross section taken along a left and right direction.

As shown in FIG. 1, the vibration control equipment 1 is applied as, for example, an engine mount for damping and absorbing vibration input from an engine (a vibration generating body), which is not shown, mounted on for example, a construction machine, to suppress the vibration from being transmitted to a vehicle body (a vibration receiving body), which is not shown. The vibration of the engine is rolling vibration caused by a rotation around a driving shaft thereof, and the vibration control equipment damps and absorbs the rolling vibration. The driving shaft of the engine which is not shown is extended in the front and rear direction, but the vibrating direction of the engine is the left and right direction in planar view.

The vibration control equipment 1 includes the pair of damping rubbers 2A and 2B, a bracket member 3, a pair of plate members 4A and 4B, and a fastening member 5.

The construction of the damping rubber 2A (2B) will now be described.

As shown in FIG. 2, the damping rubber 2A (2B) includes an outer tube 20 of substantially cylindrical shape, an inner tube 21 of substantially cylindrical shape which has a diameter smaller than that of the outer tube 20, is disposed in the outer tube 20, and is spaced apart from the outer tube, and a rubber elastic body 22 interposed between the outer tube 20 and the inner tube 21.

The outer tube 20 is provided at the axial outer end portion thereof with a flange portion 23 straightly protruding to the outside in a radial direction. The flange portion 23 is extended along the entire circumference of the outer tube 20.

The flange portion 23 is provided with a positioning portion 24 for determining circumferential positions of the damping rubbers 2A and 2B with respect to the bracket member 3 so that mold cavity portions 26A and 26B described below are disposed in line with the vibrating direction of the engine which is not shown. The positioning portion 24 is a pin-shaped convex portion protruding toward an inner surface 23a of the axial inner side of the flange portion 23, and is engaged with an engaging portion 31 described below. The positioning portion 24 is provided on each pair of upper and lower outer tubes 20 and 20.

The inner tube 21 is concentrically disposed in the outer tube 20, and has a whole length longer than that of the outer tube 20 so that the inner tube 21 protrudes from the outer tube 20 to the outside in the axial direction. Also, in the case where an external force is not applied, the end surface of the axial inner side of the inner tube 21 is placed at the axial outer side rather than the end surface of the axial inner side of the outer tube 20.

The rubber elastic body 22 is adapted to resiliently connect the outer tube 20 with the inner tube 21, and is cure-adhered to the inner circumferential surface 20a of the outer tube 20 and the axial outer surface 23b of the flange portion 23 and also cure-adhered to the outer circumferential surface 21a of the inner tube 21. The rubber elastic body 22 is formed in the shape of taper, of which the diameter is gradually decreased towards the axial outer side, and the end surface 22a of the axial inner side of the rubber elastic body 22 is formed in a concave shape as a curved portion. The rubber elastic body 22 is provided in the end surface 22b of the axial outer side with a groove 25 extending in a circumferential direction along the entire circumference, the groove being formed in a U shape of a cross section.

The rubber elastic body 22 is provided with the mold cavity portions 26A and 26B for lowering the rigidity in one direction to allow the damping rubbers 2A and 2B to have an anisotropic aspect. The mold cavity portions 26A and 26B are thinned-down portions formed by removing a portion of the rubber elastic body 22, and are through-holes extending in the axial direction. The mold cavity portions 26A and 26B are disposed at opposite positions, with the inner tube 21 being interposed therebetween in the radial direction. The mold cavity portions 26A and 26B are each formed in both directions, each deviated from the positioning portion 24 around the central axis O by 90° in a plan view of the damping rubbers 2A and 2B.

The damping rubbers 2A and 2B constructed as described above are paired, as shown in FIG. 1, in such a way that one damping rubber 2A is disposed vertically symmetrically with the other damping rubber 2B. In other words, the pair of damping rubbers 2A and 2B is disposed on the same axis in such a way that the end surfaces of the axial inner sides are layered on each other.

As shown in FIG. 3, the bracket member 3 is a thick plate member, and is fixed and substantially horizontally installed to any one of the engine and the vehicle body (not shown). The bracket member 3 is provided with, a substantially circular fixing hole 30. As shown in FIGS. 1 to 3, each of the outer tubes 20 and 20 of the pair of damping rubbers 2A and 2B is disposed in the fixing hole 30. Upper and lower corners 30b and 30c of the fixing hole 30 are each chamfered over the entire circumference thereof.

The peripheral portion of the fixing hole 30 formed in the bracket member 3 is disposed between the upper and lower flange portions 23 and 23 of the pair of damping rubbers 2A and 2B, and is clamped by the upper and lower flange portions 23 and 23.

An engaging portion 31 which is engaged with the positioning portion 24 is formed at the peripheral portion of the fixing hole 30 formed in the bracket member 3. The engaging portion 31 has a through-hole 32 vertically penetrating the bracket member 3, and is formed in both the upper and lower surfaces 3a and 3b of the bracket member 3. A planar position of the engaging portion 31 is set so that the mold cavity portions 26A and 26B are disposed in line with the vibrating direction when the positioning portion 24 is engaged with the engaging portion 31. More specifically, the engaging portion 31 is formed at the position of the front and rear sides with respect to the central axis O.

As shown in FIG. 1, the pair of plate members 4A and 4B are plates pinching the pair of damping rubbers 2A and 2B vertically, and are attached to the axial outer ends of the pair of damping rubbers 2A and 2B. At least one of the pair of plate members 4A and 4B is fixed to either the engine or the vehicle body which is not shown. In other words, in the case where the bracket member 3 is fixed to the engine, the plate members 4A and 4B are fixed to the vehicle body, while in the case where the bracket member 3 is fixed to the vehicle body, the plate members 4A and 4B are fixed to the engine. Also, the pair of plate members 4A and 4B is provided with a bolt hole 40 through which a bolt 50 described below passes. The bolt hole 40 communicates with the inner tube 21.

The fastening member 5 is adapted to connect the pair of plate members 4A and 4B, and has a bolt 50 and a nut 51. The bolt 50 is inserted into the bolt hole 40 of one plate member 4A from the axial outer side (the upper side in FIG. 1) of the plate member 4A, and passes the pair of upper and lower inner tubes 21 and 21 and the bolt hole 40 of the other plate member 4B to protrude from the axial outer side (the lower side in FIG. 1) of the plate member 4B. A tip of the bolt 50 protruding from the bolt hole 40 of the other plate member 4B is threadably engaged with the nut 51.

The above-mentioned vibration control equipment 1 is assembled as mentioned below.

First, in order to interpose the bracket member 3 between the pair of the damping rubbers 2A and 2B, the pair of damping rubbers 2A and 2B are disposed on and under the bracket member 3, and the outer tube 20 of one damping rubber 2A is inserted into the fixing hole 30 of the bracket member 3 from the upper side of the bracket member 3. The outer tube 20 of the other damping rubbers 2B is inserted into the fixing hole 30 of the bracket member 3 from the lower side of the bracket member 3. In this instance, the outer tubes 20 and 20 have an outer diameter smaller than the inner diameter of the fixing hole 30, and a clearance (approximately 0.2 to 1.3 mm) is formed to some extent between an outer circumferential surfaces 20b of the outer tubes 20 and 20 and an inner circumferential surface 30a of the fixing hole 30. That is the outer tubes 20 and 20 are inserted into the fixing holes 30 in a non-pressing state.

When the outer tubes 20 and 20 are inserted into the fixing hole 30, in order to dispose the mold cavity portions 26A and 26B in line with the vibrating direction of the engine which is not shown, each circumferential position of the damping rubbers 2A and 2B is determined with respect to the bracket member 3 by the positioning portion 24. More specifically, the positioning portion 24 is inserted into the engaging portion 31 formed in the bracket member 3. Since the engaging portion 31 is formed at the front and rear sides with respect to the central axis O, the positioning portion 24 is positioned at the front and rear sides with respect to the central axis O. Also, since mold cavity portions 26A and 26B are respectively formed in both directions, each deviated from the positioning portion 24 around the central axis O by 90° in a plan view of the damping rubbers 2A and 2B, the mold cavity portions 26A and 26B are disposed in a direction perpendicular to the front and rear direction, that is, the left and right direction. As described above, since the driving shaft of the engine which is not shown is extended in the front and rear direction and thus the vibrating direction of the engine is the left and right direction in the plan view, the direction of the mold cavity portions 26A and 26B coincides with the vibrating direction of the engine.

Next, the pair of plate members 4A and 4B are disposed on and under the pair of damping rubbers 2A and 2B so that the pair of damping rubbers 2A and 2B are interposed between the pair of plate members 4A and 4B.

The bolt 50 is inserted into the bolt hole 40 of one plate member 4A to pass through the pair of the inner tubes 21 and 21, and the tip of the bolt 50 protrudes from the bolt hole 40 of the other plate member 4B and is threadably engaged with the nut 51. This allows the pair of plate members 4A and 4B to connect to each other through the fastening member 5 (i.e., the bolt 50).

To continue, the bolt 50 or the nut 51 is rotated to fasten the fastening member 5. As the fastening member 5 is fastened, the interval between the pair of plate members 4A and 4B is decreased, so that the pair of the damping rubbers 2A and 2B is vertically pressed by the pair of plate members 4A and 4B. Therefore, the inner tube 21 is axially pushed to the inside, and the axial inner end surface of the inner tube 21 protrudes into the axial inner side rather than the end surface of the axial inner side of the outer tube 20, so that the opposing axial inner ends of the pair of upper and lower inner tubes 21 and 21 come into contact with each other. Also, the rubber elastic body 22 is preliminarily compressed in the axial direction, and thus is elastically deformed in such a way that it is radially expanded to the outside. This causes the inner surfaces 23a and 23 of the flange portions 23 and 23 of the pair of upper and lower outer tubes 20 and 20 to come into close contact with the upper and lower surfaces 3a and 3b of the bracket member 3, and the bracket member 3 is clamped between the upper and lower flange portions 23 and 23, so that the pair of the damping rubbers 2A and 2B is fixed to the bracket member 3.

With the above processes, the assembly of the vibration control equipment 1 is completed.

In the vibration control equipment 1 according to the first embodiment, since the mold cavity portions 26A and 26B are disposed in the left and right direction, the rigidity (static spring constant) of the damping rubbers 2A and 2B in the left and right direction (i.e., the vibrating direction of the engine) can be lowered, without lowering the rigidity (static spring constant) of the damping rubbers 2A and 2B in the upward and downward direction and the front and rear direction. This causes the natural vibration frequency of the rolling direction to lower as compared with the case where there are no mold cavity portions 26A and 26B. Therefore, the natural vibration frequency of the rolling direction is separated from revolutions of the engine, and the transmissibility of the vibration is lowered. That is, it is possible to improve the vibration-resistance properties of the damping rubbers 2A and 2B, while ensuring the support rigidity of the damping rubbers 2A and 2B. Also the rubber elastic body 22 is provided with the mold cavity portions 26A and 26B while using a solid material harder than a conventional material, so that the support rigidity of the damping rubbers 2A and 2B is improved, while ensuring the vibration-resistance properties of the damping rubbers 2A and 2B.

A test confirming the effect will now be described. This test was carried out by comparing the case where an engine was driven by using a vibration control equipment having no mold cavity portion with the case where an engine was driven by using the vibration control equipment having the mold cavity portions. The vibration control equipment having the same configuration was utilized in this test, except for the mold cavity portions. The vibration control equipment having no mold cavity portion had a static spring constant of 1200 (N/mm) in a front and rear direction, 1200 (N/mm) in a left and right direction, and 1450 (N/mm) in an upward and downward direction. Meanwhile, the vibration control equipment having the mold cavity portions in the left and right direction had a static spring constant of 1200 (N/mm) in a front and rear direction, 725 (N/mm) in a left and right direction, and 1450 (N/mm) in an upward and downward direction. When the vibration test using both above-mentioned vibration control equipment was carried out under the same conditions, the vibration control equipment having no mold cavity portion had the natural vibration frequency of 21.5 (Hz) in the rolling direction of the engine, while the vibration control equipment having the mold cavity portions had the natural vibration frequency of 18.1 (Hz) in the rolling direction of the engine, which is lower than that of the vibration control equipment having no mold cavity portions. As a result, the vibration transmissibility of the vibration control equipment having no mold cavity portion was 20%, while the vibration transmissibility of the vibration control equipment having the mold cavity portions was 14%. The vibration transmissibility was lowered as compared with that of the vibration control equipment having no mold cavity portion. It is apparent from the above test result that the vibration-resistance properties were improved by the mold cavity portions.

With the vibration control equipment 1 according to the first embodiment, the circumferential positions of the damping rubbers 2A and 2B with respect to the bracket member 3 are determined by the positioning portion 24, so that the positions of the mold cavity portions 26A and 26B are set in line with the vibrating direction of the engine. Therefore, it is possible to insert the outer tubes 20 and 20 of the damping rubbers 2A and 2B into the fixing holes 30 of the bracket member 3 in a non-pressing state. As a result, since the complicated process of press-fitting the outer tube 20 is not required, it is possible to easily assemble the vibration control equipment 1. Also, since the press fitting process is not carried out, jigs or the like are not required for the press fitting process, and thus the production cost is significantly reduced.

Also, since the bracket member 3 is provided with the engaging portion 31 which is engaged with the positioning portion 24, it is possible to easily and reliably determine the circumferential position of the damping rubbers 2A and 2B by engaging the engaging portion 31 with the positioning portion 24 when positioning.

Since the positioning portion 24 is formed on the flange portion 23 of the outer tube 20, it is possible to easily manufacture the outer tube 20 as compared with the case where the positioning portion 24 is formed on the outer circumferential surface 20b of the outer tube 20.

Also, since the engaging portion 31 engaging with the positioning portion 24 is provided on the upper and lower surfaces 3a and 3b of the bracket member 3 opposite to the flange portion 3 of the outer tube 20, it is possible to easily manufacture the bracket member 3 as compared with the case where the engaging portion is formed on the inner circumferential surface 30a of the fixing hole 30. Therefore, it is possible to reduce the production cost for components.

The pair of upper and lower outer tubes 20 and 20 is provided with the positioning portions 24, respectively, and the bracket member 3 is provided with the through-hole 32 penetrating vertically the bracket member 3. Since the engaging portion 31 is formed on the upper and lower surfaces 3a and 3b of the bracket member 3 by the through-hole 32, when the pair of damping rubbers 2A and 2B is attached to the bracket member 3, the pair of the damping rubbers 2A and 2B is positioned by the positioning portion 24. This allows the mold cavity portions 26A and 26B provided on one damping rubber 2A and the mold cavity portions 26A and 26B provided on the other damping rubber 2B to dispose in line with the vibrating direction of the engine.

Further, since the mold cavity portions 26A and 26B penetrate in the axial direction, it is possible to easily form the mold cavity portions 26A and 26B as compared with the damping rubber having a non-penetrating mold cavity portion, and thus the production cost of the damping rubbers 2A and 2B can be reduced. It is possible to easily set the property of the damping rubbers 2A and 2B with the penetrating mold cavity portions 26A and 26B as compared with, the damping rubber with non-penetrating mold cavity portion.

Second Embodiment

Next, a vibration control equipment 101 according to a second embodiment of the present invention will now be described. Like parts are designated by the same reference numerals as the first embodiment, and the description thereof will be omitted herein.

Figure 4:
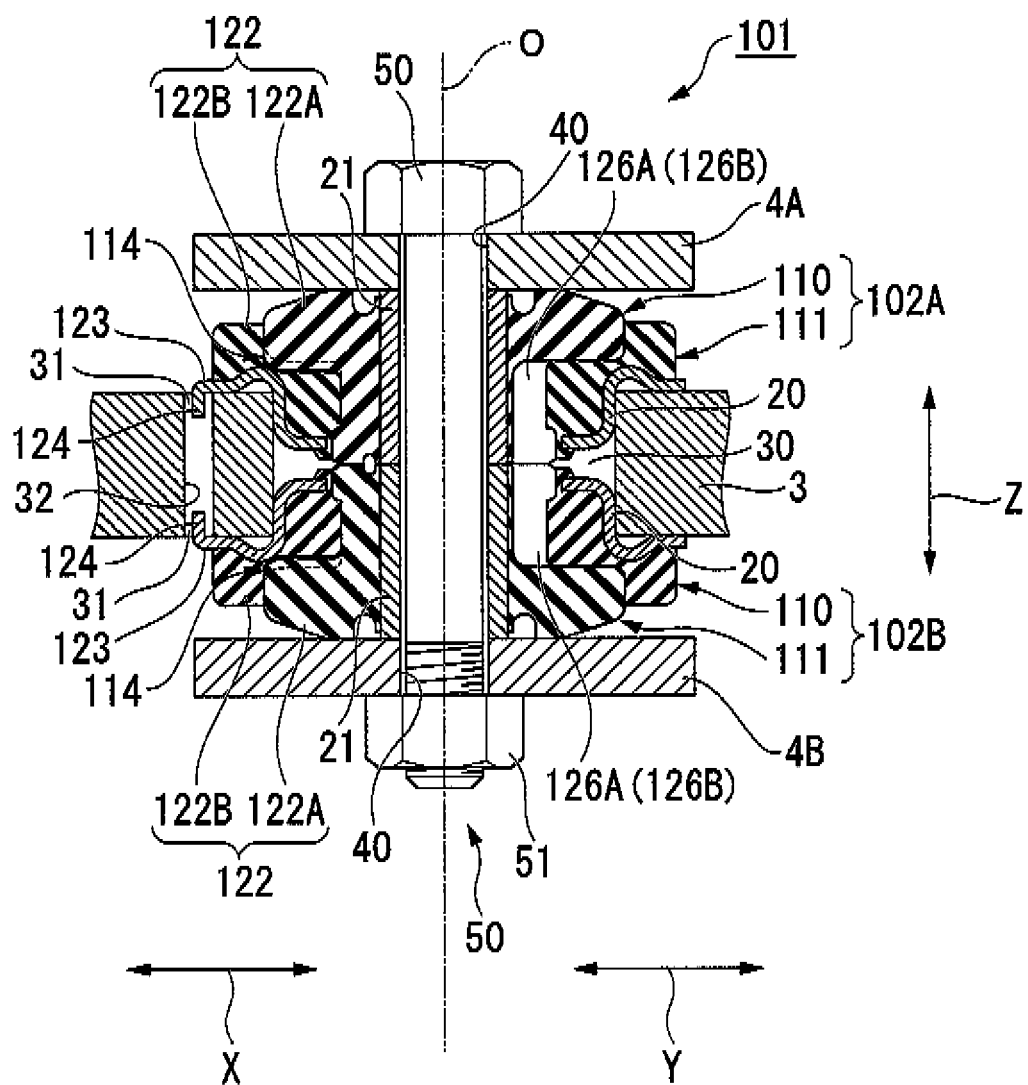
FIG. 4 is a cross-sectional view of vibration control equipment to explain a second embodiment of the present invention.

FIG. 4 is a cross-sectional view of the vibration control equipment 101 according to the second embodiment.

Figure 5:
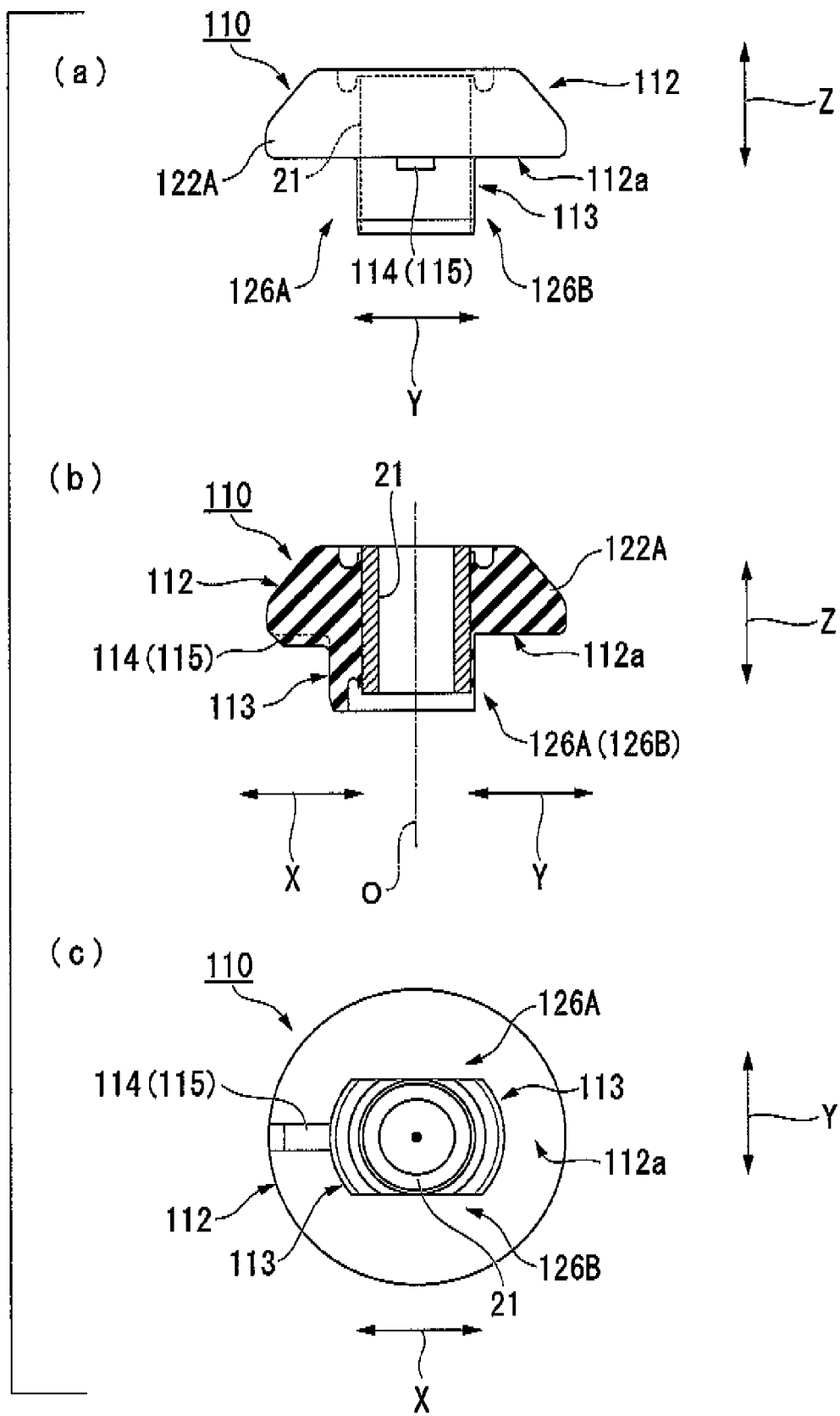
FIG. 5 is a view showing an inner tube side segment body to explain the second embodiment of the present invention, in which (a) is a side view, (b) is a cross-sectional view, and (c) is a plan view.

FIG. 5 is a view showing an inner tube side segment body 110, in which (a) of FIG. 5 is a side view, (b) of FIG. 5 is a cross-sectional view, and (c) of FIG. 5 is a plan view when viewing at the axial inner side.

Figure 6:
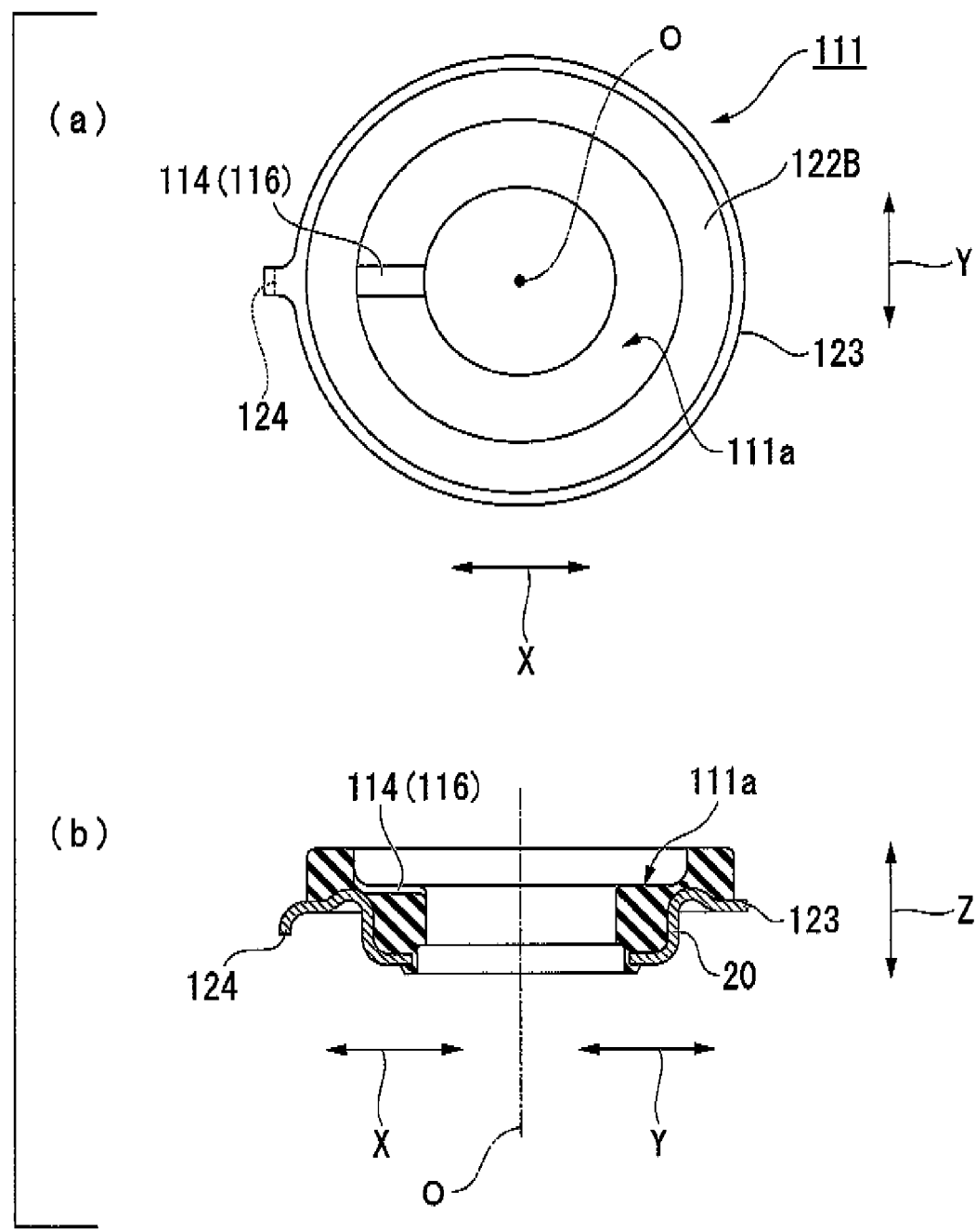
FIG. 6 is a view showing an outer tube side segment body to explain the second embodiment of the present invention, in which (a) is a plan view, and (b) is a cross-sectional view.

FIG. 6 is a view showing an outer tube side segment body 111, in which (a) of FIG. 6 is a plan view when viewing from the axial outer side, and (b) of FIG. 6 is a cross-sectional view.

The left half body (the left side of the central axis O) in FIG. 4, (b) of FIG. 5 and (b) of FIG. 6 is a cross-sectional view taken in the front and rear direction, while the right half body (the right side of the central axis O) is a cross-sectional view taken in the left and right direction.

The outer tube 20 and the inner tube 21 are connected to each other by one rubber elastic body 22 in the first embodiment, but damping rubbers 102A and 102E may be formed by assembling a plurality of segment bodies 110 and 111, as the vibration control equipment 101 according to the second embodiment shown in FIG. 4.

More specifically, the damping rubbers 102A and 102B are formed by combining an inner tube side segment body 110 shown in FIG. 5 with an outer tube side segment body 111 shown in FIG. 6.

The damping rubbers 102A and 102E may be divided into at least three parts, for example, annular segment body made of a rubber elastic body may be provided between the outer tube side segment body and the inner tube side segment body.

As shown in FIGS. 4 and 5, the inner tube side segment body 110 is formed by attaching an inner circumferential portion 122A of a rubber elastic body 122 to the inner tube 21. The inner tube side segment body 110 is formed in a shape of headed bolt, and is composed of a head portion 112 of which a rubber portion of an axial outer side is enlarged, and a leg portion 113 of which an axial inner side is formed in a cylindrical shape. In the inner tube side segment body 110, both radial portions of the leg portion 113 are cut in an axial direction to form non-penetrating mold cavity portions 126A and 126B.

As shown in FIGS. 4 and 6, the outer tube side segment body 111 is formed by attaching an outer circumferential portion 122B of the rubber elastic body 122 to the outer tube 20. The outer tube side segment body 111 has a stepped inner circumferential surface, so that the head portion 112 and the leg portion 113 of the inner tube side segment body 110 are separately fitted.

A segment body positioning portion 114 for determining a relative circumferential position between the inner tube side segment body 110 and the outer tube side segment body 111 is provided between the inner tube side segment body 110 and the outer tube side segment body 111. The segment body positioning portion 114 is composed of a convex portion 115 and a concave portion 116 which are fitted to each other. The convex portion 115 is formed on an inner surface 112a on the axial inner side of the head portion 112 of the inner tube side segment body 110, and the concave portion 116 is formed on the stepped surface 111a on the inner circumferential surface of the outer tube side segment body 111. The concave portion 116 may be formed on the inner tube side segment body 110, and the convex portion 115 may be formed on the outer tube side segment body 111.

The vibration control equipment 101 according to the second embodiment achieves the following effect, in addition to the effect obtained in the first embodiment.

Namely, with the vibration control equipment 101 according to the second embodiment, it is possible to easily form the rubber elastic body 122, and defects, such as hollows or cracks, are hardly formed in the rubber elastic body 122 as compared with the first embodiment in which the damping rubber is formed in single part. This can improve the quality of the vibration control equipment 101.

Also, since the segment body positioning portion 114 is provided between the pair of the inner tube side segment body 110 and the outer tube side segment body 111 which are assembled, the relative circumferential position between the inner tube side segment body 110 and the outer tube side segment body 111 is determined by the segment body positioning portion 114, and there is no positional difference between the inner tube side segment body 110 and the outer tube side segment body 111. Therefore, if the circumferential position of the outer tube side segment body 111 is determined with respect to the bracket member 3 by a positioning portion 124 provided on the outer tube 20, the position of the inner tube side segment body 110 assembled to the outer tube side segment body 111 is determined. Accordingly, the mold cavity portions 126A and 126B provided on the inner tube side segment body 110 are disposed in line with the vibrating direction.

The fitting portion of the inner tube side segment body 110 and the outer tube side segment body 111 is formed in a rectangular shape, so that it is possible to determine the relative position of the circumferential direction between the inner tube side segment body 110 and the outer tube side segment body 111. It is possible to determine the relative positions of the circumferential direction between the inner tube side segment body 110 and the outer tube side segment body 111 by pressing the inner tube side segment body 110 into the inner circumference of the outer tube side segment body 111. In this case, the segment body positioning portion 114 may be omitted.

Although the vibration control equipment according to the first and second embodiments of the present invention is described, the present invention is not limited thereto, and can be properly modified without deviating from the scope of the claimed invention.

Figure 7:
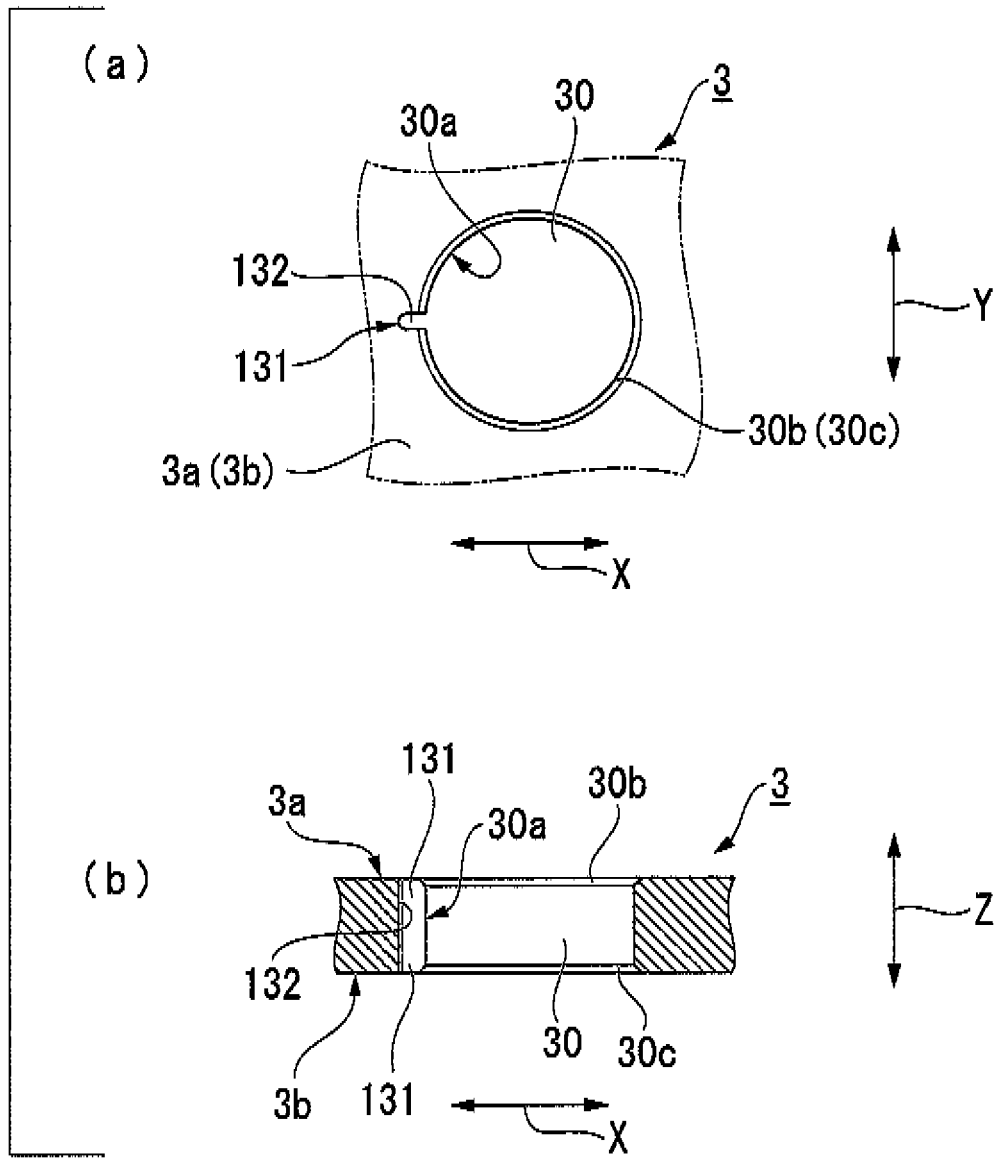
FIG. 7 a view showing a bracket member to explain another embodiment of the present invention, in which (a) is a plan view, and (b) is a cross-sectional view.

For example, according to the above-mentioned embodiments, although the engaging portions 31 and 31 are formed by the through-hole 32 formed in the bracket member 3, as shown in FIG. 3, it is not necessary to form the engaging portion 31 by using the through-hole in the present invention, for example, the engaging portion may be formed by using a non-penetrating hole, or an engaging portion 131 may be formed by using a cut portion 132 extending from the inner circumferential, surface 30a of the fixing hole 30 of the bracket member 3 to the outside in the radial direction, as shown in FIG. 7.

In addition, in these embodiments, although the positioning portion 24 is provided on each of the outer tubes 20 and 20 of the pair of damping rubbers 2A and 2B, and the engaging portion 31 is formed on each of the upper and lower surfaces 3a and 3b of the bracket member 3, the positioning portion 24 may be formed on any one of the pair of damping rubbers 2A and 2B in the present invention. For example, in the case where the mold cavity portions 26A and 26B are provided on only one damping rubber 2A and the mold cavity portions 26A and 26B are not provided on the other damping rubber 2B, it is not necessary to determine the circumferential position of the other damping rubber 2B with respect to the bracket member 3, and the positioning portion 24 may not be formed on the outer tube 20 of the other damping rubber 2B. In this case, it is not necessary to form the engaging portion 31 on the lower surface 3b of the bracket member 3 opposite to the flange portion 23 of the outer tube 20 of the other damping rubber 2B.

Figure 8:
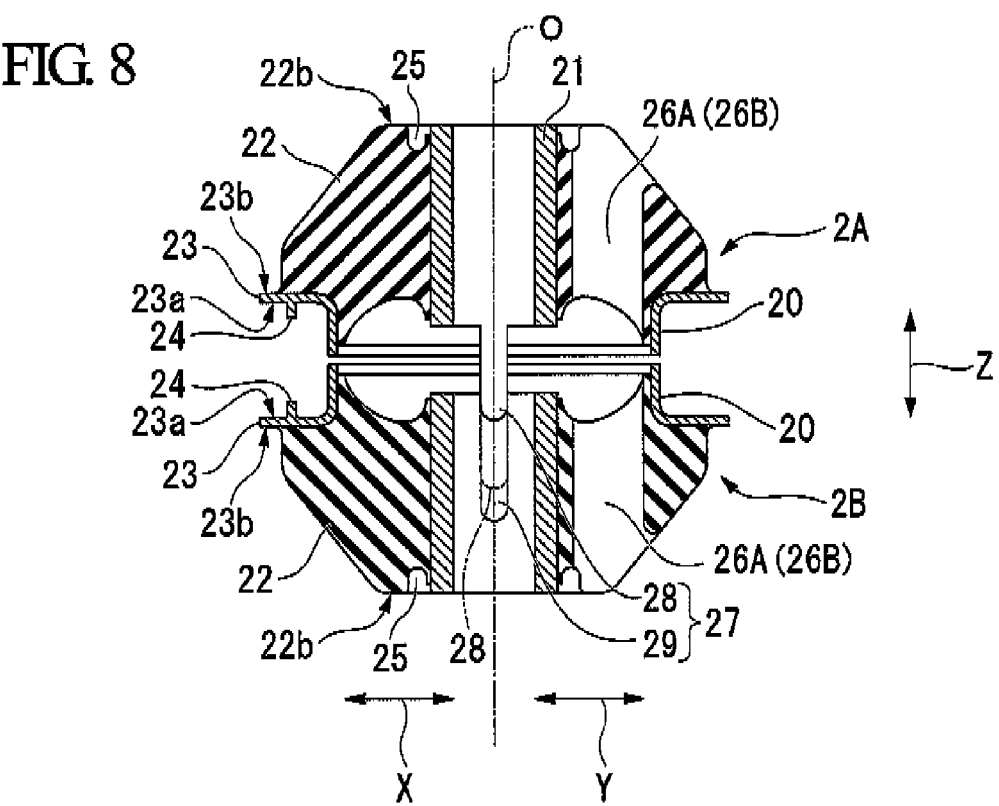
FIG. 8 is a cross-sectional view of a pair of damping rubbers to explain another embodiment of the present invention.

In the case where the pair of damping rubbers 2A and 2B are provided with the mold cavity portions 26A and 26B, as shown in FIG. 8, the positioning portion 24 may be formed on any one of the pair of damping rubbers 2A and 2B, if a damping rubber positioning portion 27 for determining the relative circumferential position between the pair of the damping rubbers 2A and 2B is formed between the pair of damping rubbers 2A and 2B. The damping rubber positioning portion 27 is composed of a convex portion 28 and a concave portion 29 which are fitted to each other. The convex portion 28 is formed on the axial inner end of the inner tube 21 of one damping rubber 2A, while the concave portion 29 is formed on the axial inner end of the inner tube 21 of the other damping rubber 28. The convex portion 28 or the concave portion 29 may be formed on the outer tubes 20 and 20 of the pair of damping rubbers 2A and 2B.

Although the positioning portion 24 is only provided on the outer tube 20 of one damping rubber 2A and the positioning portion 24 is not provided on the outer tube 20 of the other damping rubber 2B, the circumferential position of the other damping rubber 2B is determined with respect to the bracket member 3. Accordingly, it is possible to dispose the mold cavity portions 26A and 26B provided on the other damping rubber 2B in line with the vibrating direction.

Figure 9:
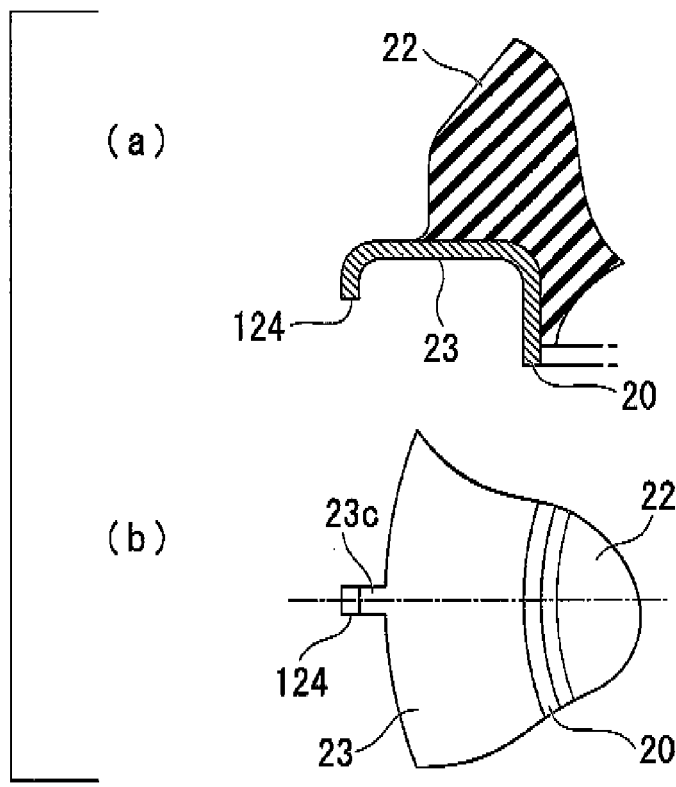
FIG. 9 is a partially enlarged view showing a positioning portion to explain another embodiment of the present invention, in which (a) is a cross-sectional view, and (b) is a plan view.

In the above-mentioned embodiments, although the pin-shaped positioning portion 24 protrudes from the inner surface 23a of the flange portion 23 of the outer tube 20, the positioning portion of the present invention is not limited thereto. For example, as shown in FIG. 9, the positioning portion 124 may be formed by bending the boss 23c inwardly in the axial direction, the boss protruding from the outer circumference edge of the flange portion 23 to the outside in the radial direction. This allows the positioning portion 124 to be easily formed.

Figure 10:
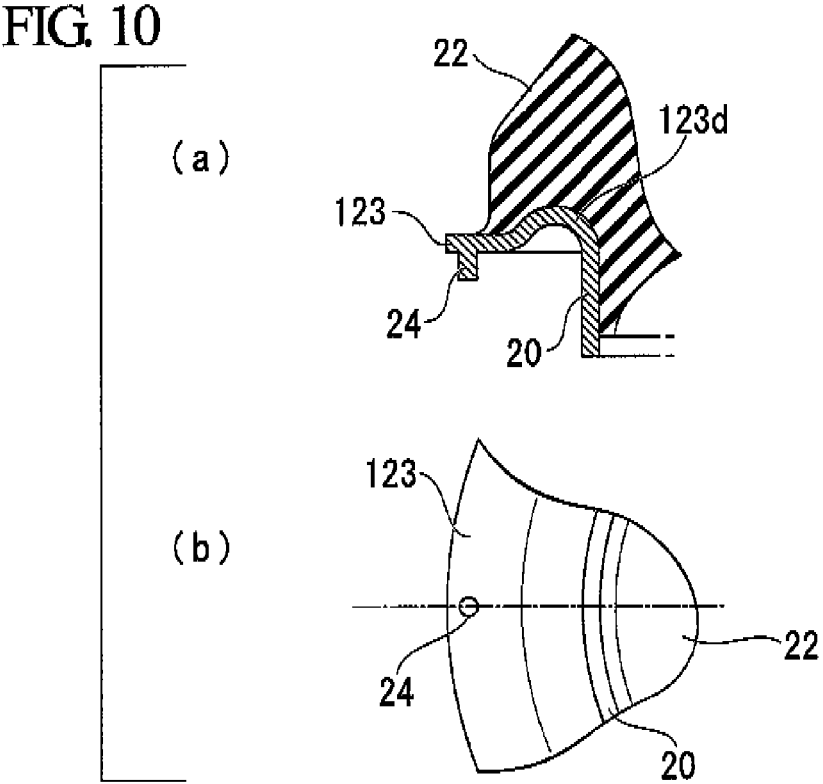
FIG. 10 is a partially enlarged view showing a flange portion to explain another embodiment of the present invention, in which (a) is a cross-sectional view, and (b) is a plan view.

In the above-mentioned embodiments, although the flange portion 23 straightly protrudes from the axial outer end of the outer tube 20 to the outside in a radial direction, as shown in FIG. 10, a flange portion 123 may have a proximal end rounded towards the axial outside. This can prevent interference between a curved portion 123d of the proximal end of the flange portion 23 and the corner of the fixing hole 30 of the bracket 3, and it is possible to omit the chamfering process for the corner of the fixing hole 30.

Figure 11:
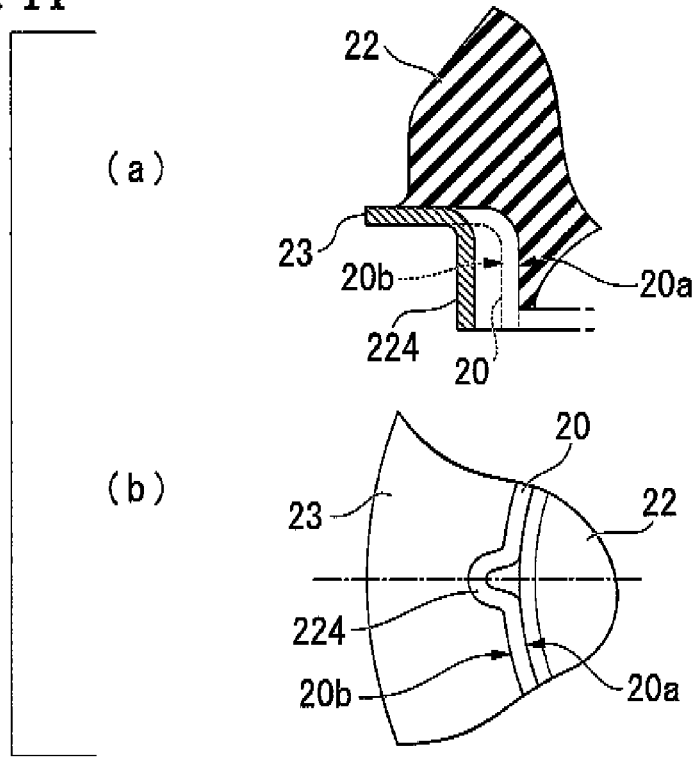
FIG. 11 is a partially enlarged view showing a positioning portion to explain another embodiment of the present invention, in which (a) is a cross-sectional view, and (b) is a plan view.

In the above-mentioned embodiments, although the flange portion 23 is provided with the positioning portion 24, the present invention is not limited to the positioning portion 24 provided on the flange portion 23. For example, as shown in FIG. 11, a positioning portion 224 may be provided on the outer circumferential surface 20b of the outer tube 20. In this case, the bracket member 3 is formed with the engaging portion 131 formed by the cut portion 132 shown in FIG. 7, and the positioning portion 224 is engaged with the engaging portion 131.

In the above-mentioned embodiments, although the outer tube 20 and the inner tube 21 are disposed on the same axis, the outer tube 20 and the inner tube 21 may be eccentrically disposed.

Also in the above-mentioned embodiments, although the rubber elastic body 22 is provided with two symmetrical mold cavity portions 26A and 26B, with the inner tube 21 being interposed between the mold cavity portions 26A and 26B, the mold cavity portion may be formed on only the inner tube 21 in any one of the left and right directions.

In the above-mentioned embodiment, although the damping rubbers 2A and 2B having the same configuration are assembled as the pair of damping rubbers 2A and 2B, damping rubbers 2A and 2B having different configuration may be assembled as the pair of damping rubbers 2A and 2B. For example, damping rubbers may be assembled, in which the shape or material of the outer tube 20 or the inner tube 21 is different or the shape or material of the rubber elastic body 22 is different. The placement position or shape of the mold cavity portion of one damping rubber 2A and the mold cavity portion of the other damping rubber 2B may be different. The mold cavity portion may be formed in one damping rubber 2A only in one of the left and right directions, and the mold cavity portion may be formed in the other damping rubber 2B only in the other of the left and right directions.

In the above-mentioned embodiment, although the bracket member 3 is provided with the engaging portion 31 and the positioning portion 24 is engaged with the engaging portion 31, the present invention may employ a configuration in which the bracket member 3 is not provided with the engaging portion 31. For example, the positioning portion may be an eye mark for aligning the position visually. In this case, the bracket member 3 may be provided with a mark for aligning a position, without requiring an engaging portion such as the engaging portion 31.

In the above-mentioned embodiment, although one positioning portion 24 is provided for one outer tube 20, a plurality of positioning portions 24 may be provided for one outer tube 20.

Figure 12:
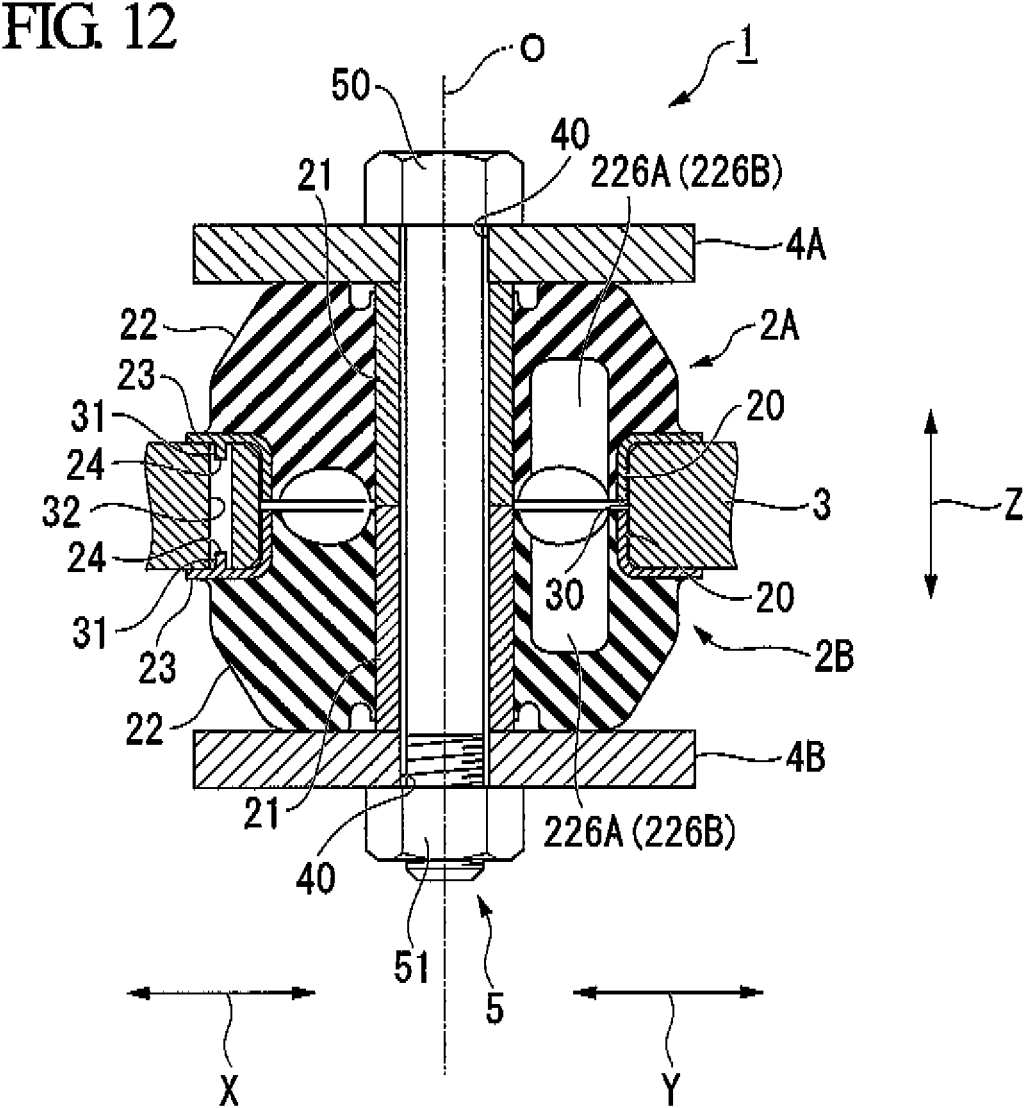
FIG. 12 is a cross-sectional view of vibration control equipment to explain another embodiment of the present invention.

Also, in the above-mentioned embodiment, although the mold cavity portions 26A and 26B are axially penetrated, as shown in FIG. 12, mold cavity portions 226A and 226B with a non-through hole extending in the axial direction may be used.

In addition, components in the above-mentioned embodiment may be properly displaced with components known in the art, without departing from the scope of the claimed invention, and the above-mentioned alternative embodiments may be properly combined.

INDUSTRIAL APPLICABILITY

With the vibration control equipment according to the present invention, the outer tubes of the damping rubbers are inserted into the fixing holes of the bracket member in the non-pressing state, and in order to dispose the position of the mold cavity portion in line with the vibrating direction of the vibration generating body, the circumferential position of the damping rubbers is determined with respect to the bracket member by the positioning portion. Therefore, it is possible to improve the vibration-resistance properties of the damping rubbers, while ensuring the support rigidity of the damping rubbers. Also, it is possible to easily assemble the vibration control equipment, and thus lower the production cost.

The invention claimed is:

1. A vibration control equipment comprising:
 a pair of damping rubbers each having an outer tube, an axial outer end of the outer tube being provided with a flange portion extending outwardly in a radial direction, an inner tube disposed in the outer tube, and a rubber elastic body that connects the outer tube and the inner tube, the damping rubbers being symmetrically disposed in a vertical direction;
 a pair of plate members, with the pair of damping rubbers being interposed between the pair of plate members;
 a bracket member interposed between the upper and lower flange portions of the pair of damping rubbers, and provided with a fixing hole, through which each outer tube of the pair of damping rubbers is inserted from an upper portion and a lower portion; and
 a fastening member that connects the pair of plate members,
 wherein the bracket member is fixed to any one of a vibration generating body and a vibration receiving body, and at least one of the pair of plate members is fixed to the other of the vibration generating body and the vibration receiving body, and
 the pair of rubber elastic bodies of the pair of damping rubbers are axially compressed through the pair of plate members by firmly fastening the fastening member, characterized in that
 before the fastening member is firmly fastened, the outer tube has an outer diameter smaller than an inner diameter of the fixing hole;
 the pair of rubber elastic bodies of the pair of damping rubbers are compressively deformed by firmly fastening the fastening member, so that the flange portion comes into close contact with the bracket member to clamp the bracket member by the upper and lower flange portions;
 each of the pair of rubber elastic bodies is provided with a mold cavity portion axially penetrating therethrough;
 at least one of the pair of outer tubes is provided with a positioning portion, that determines the circumferential positions of the pair of damping rubbers with respect to the bracket member;
 the bracket member includes an engaging portion, the engaging portion comprising a through hole axially penetrating the bracket member, such that the positioning portion on the at least one of the pair of outer tubes is inserted into the engaging portion;
 each of the pair of rubber elastic bodies is provided with an opening at an axial outer end thereof after the fastening member is firmly fastened, the opening in which the mold cavity portion opens outward in the radial direction; and
 the pair of mold cavity portions of the pair of rubber elastic bodies are disposed at a same position as each other in a circumferential direction of the inner tube.

2. The vibration control equipment according to claim 1, wherein the positioning portion is provided on the flange portion.

3. The vibration control equipment according to claim 1, wherein a damping rubber positioning portion is provided between the pair of damping rubbers to determine a relative circumferential position between the pair of damping rubbers.

4. The vibration control equipment according to claim 1, wherein each of the pair of damping rubbers includes an outer tube side segment body, in which an outer circumferential portion of the rubber elastic body is attached to the outer tube, and an inner tube side segment body, in which an inner circumferential portion of the rubber elastic body is attached to the inner tube to form the mold cavity portion.

5. The vibration control equipment according to claim 4, wherein a segment body positioning portion is provided between the segment bodies to determine a relative circumferential position between the segment bodies.

6. The vibration control equipment according to claim 1, wherein the positioning portion is pin-shaped convex.

* * * * *